United States Patent [19]
Hauer et al.

[11] Patent Number: 5,680,755
[45] Date of Patent: Oct. 28, 1997

[54] CONVERTIBLE EJECTOR SELECTIVELY COOLED THRUST VECTORING EXHAUST NOZZLE

[75] Inventors: Thomas A. Hauer, West Chester; William C. Lippmeier, Loveland, both of Ohio

[73] Assignee: General Electric Company, Cincinnati, Ohio

[21] Appl. No.: 533,230

[22] Filed: Sep. 25, 1995

[51] Int. Cl.$^6$ ............................................. F02K 11/00
[52] U.S. Cl. ........................ 60/266; 60/230; 60/232; 239/265.35; 239/265.39
[58] Field of Search ............................ 60/228, 230, 231, 60/232, 266, 271, 39.5; 239/265.35, 265.39, 265.41

[56] References Cited

U.S. PATENT DOCUMENTS

| | | |
|---|---|---|
| 3,062,003 | 11/1962 | Hamilton . |
| 3,367,579 | 2/1968 | Mehr ........................ 239/264.41 |
| 3,386,658 | 6/1968 | Mehr ............................... 60/271 |
| 3,432,100 | 3/1969 | Hardy et al. ................ 239/265.37 |
| 3,837,579 | 9/1974 | Camboulives et al. ........ 239/265.39 |
| 3,970,252 | 7/1976 | Smale et al. . |
| 4,018,046 | 4/1977 | Hurley .............................. 60/266 |
| 4,044,555 | 8/1977 | McLoughlin et al. . |
| 4,074,523 | 2/1978 | Holler et al. ..................... 60/266 |
| 4,128,208 | 12/1978 | Ryan et al. . |
| 4,214,441 | 7/1980 | Mouritsen et al. . |
| 4,502,636 | 3/1985 | Nightingale et al. ......... 239/265.39 |
| 4,544,098 | 10/1985 | Warburton . |
| 4,587,804 | 5/1986 | Horinouchi et al. ............. 60/230 |
| 4,643,356 | 2/1987 | Holler et al. . |
| 4,800,718 | 1/1989 | Zimmerman . |
| 4,994,660 | 2/1991 | Hauer . |
| 5,111,992 | 5/1992 | Barcza . |
| 5,141,154 | 8/1992 | Barcza . |
| 5,150,839 | 9/1992 | Reedy ........................... 239/265.39 |
| 5,174,502 | 12/1992 | Lippmeier et al. . |
| 5,215,256 | 6/1993 | Barcza . |
| 5,215,257 | 6/1993 | Barcza . |
| 5,238,189 | 8/1993 | Barcza . |
| 5,245,823 | 9/1993 | Barcza . |
| 5,269,467 | 12/1993 | Williams et al. . |
| 5,328,098 | 7/1994 | Barcza et al. . |
| 5,335,489 | 8/1994 | Thayer . |
| 5,351,888 | 10/1994 | Taylor et al. ..................... 60/232 |
| 5,364,029 | 11/1994 | Barcza . |
| 5,435,127 | 7/1995 | Luffy et al. ...................... 60/266 |
| 5,484,105 | 1/1996 | Ausdenmoore et al. ........... 60/271 |
| 5,485,959 | 1/1996 | Wood et al. ...................... 60/230 |

FOREIGN PATENT DOCUMENTS 726290  8/1955  United Kingdom .

*Primary Examiner*—Timothy Thorpe
*Assistant Examiner*—Ted Kim
*Attorney, Agent, or Firm*—Andrew C. Hess; Wayne O. Traynham

[57] ABSTRACT

A nozzle cooling system for selectively cooling longitudinally extending and circumferentially adjacent divergent exhaust flow confining elements bounding a hot exhaust gas flowpath in a divergent section of an aircraft gas turbine engine exhaust nozzle and providing pivoting capability for divergent flaps and seals in an axisymmetric vectoring nozzle. The apparatus includes axially adjacent forward and aft sections of at least one of the exhaust flow confining elements (typically referred to as flaps and seals), the adjacent forward and aft sections have forward and aft interior hot surfaces respectively, and mounting apparatus for mounting the aft section to the forward section in one of at least two positions. A first one of these two positions spaces apart the sections to form a gap (106) between the sections which allows cooling air (102) to flow onto the aft interior hot surface and a second one of these two positions places the sections in close abutting relationship so as to essentially prevent cooling air (102) from flowing onto the aft interior hot surface.

9 Claims, 4 Drawing Sheets

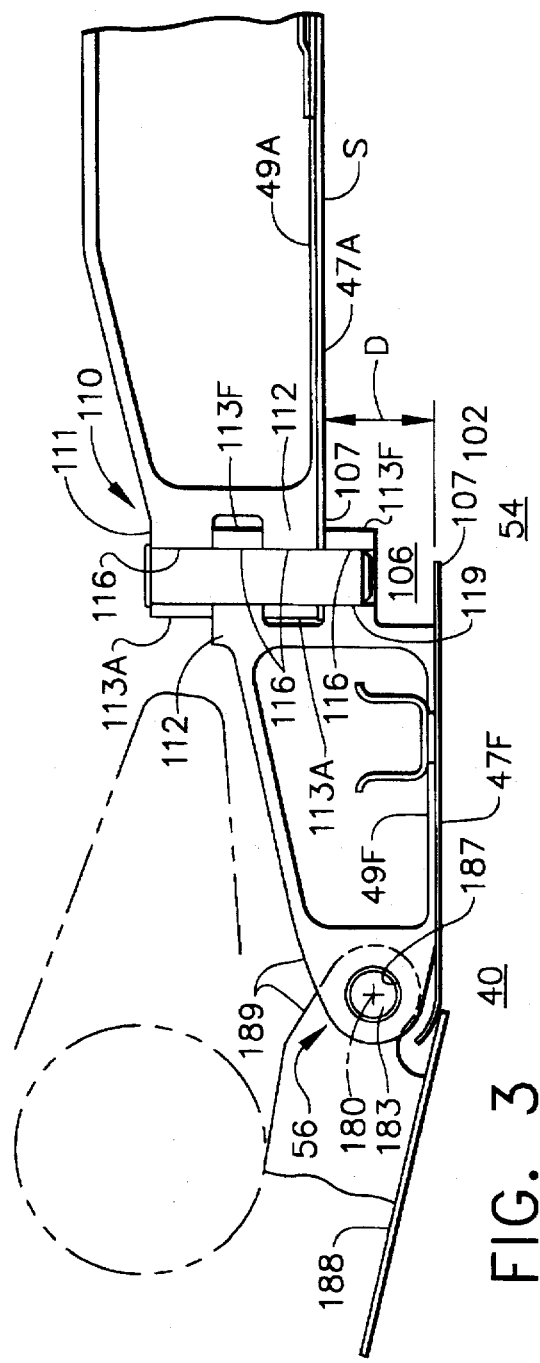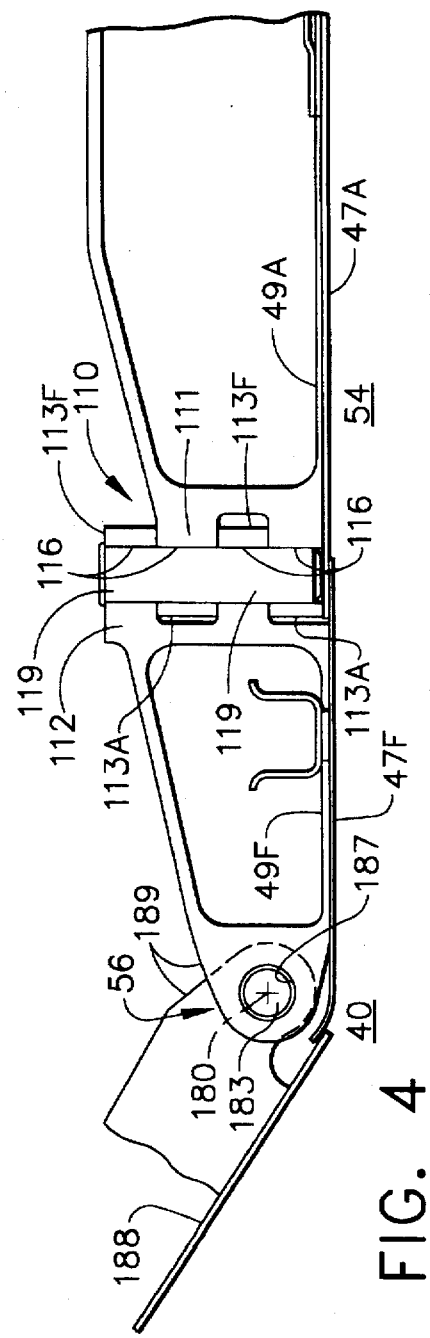

CONVERTIBLE EJECTOR SELECTIVELY COOLED THRUST VECTORING EXHAUST NOZZLE

BACKGROUND OF THE INVENTION

1. Field of the Invention

The present invention relates generally to cooling gas turbine engine exhaust nozzles and, more particularly, to a convertible ejector cooling means for the nozzles flaps and/or seals.

2. Discussion of the Background Art

Hot nozzles emit infrared radiation (IR) which is highly undesirable for military combat aircraft. Convergent and divergent flaps and seals confine hot exhaust flow and typically are used to provide variable throat area and exit area nozzles. These flow confining elements get hot and the divergent flaps and seals provide an unwanted infrared radiation (IR) signature for the engine and aircraft. Infrared radiation from gas turbine engines is conventionally suppressed by shielding and cooling the hot metal structures of the engine. Nozzles may also require or make use of cooling for structural reasons. Cooling air is conventionally drawn from the fan section or a compressor section of the gas turbine engine which is expensive in terms of fuel and power consumption. Nozzles employing cooling air ejecting, such as the type used on some General Electric J79 engine models, have employed slot type ejectors to induct ambient cooling air from the atmosphere to supplement the engine supplied cooling air in order to reduce the use of the more expensive engine air. Such ejecting nozzles provided efficient cooling for variable nozzle throats but have not been easily adapted for cooling thrust vectoring nozzles such as axisymmetric vectoring exhaust nozzles which have 2 DOF pivoting flaps and seals. U.S. patent application Ser. No. 08/072,678, entitled "AXISYMMETRIC VECTORING EXHAUST NOZZLE THERMAL SHIELD", disclosed a shielding means and a nozzle cooling means for axisymmetric vectoring nozzles to efficiently cool the nozzle and shield it from emitting infrared radiation.

One type of conventional gas turbine engine exhaust nozzle includes primary and secondary exhaust flaps arranged for defining a variable area convergent-divergent exhaust nozzle. The exhaust nozzle is generally axisymmetric, or annular, and exhaust flow is confined by the primary or convergent flaps and secondary or divergent flaps being positioned circumferentially adjacent to each other, respectively.

The divergent flaps, for example, have a forward end defining a throat of minimum flow area and an aft end having a larger flow area for defining a diverging nozzle extending downstream from the throat. The divergent flaps are variable, which means that the spacing between the divergent flaps as they are moved from a smaller radius position to a larger radius position must necessarily increase. Accordingly, conventional exhaust nozzle seals are suitably secured between adjacent divergent flaps to confine the exhaust flow and prevent leakage of exhaust flow between the divergent flaps.

An advanced axisymmetric vectoring nozzle, AVEN® nozzle, has been developed and patented in U.S. Pat. No. 4,994,660, entitled "AXISYMMETRIC VECTORING EXHAUST NOZZLE", by Hauer, assigned to the present assignee, and herein incorporated by reference. An axisymmetric vectoring nozzle provides a means for vectoring the thrust of an axisymmetric convergent/divergent nozzle by universally pivoting the divergent or divergent flaps of the nozzle in an asymmetric fashion or in other words pivoting the divergent flaps in radial and tangential directions with respect to the unvectored nozzle centerline.

Vectoring nozzles, and in particular axisymmetric vectoring exhaust nozzles of the type disclosed in the Hauer reference, provide positionable divergent flaps. These divergent flaps are positionable not only symmetrically, relative to a longitudinal centerline of the exhaust nozzle, but may also are positionable asymmetrically relative thereto for obtaining pitch and yaw vectoring. An exemplary thrust vectoring nozzle uses three vectoring actuators to translate and tilt a vectoring ring which in turn forces the divergent flaps in predetermined positions. The vectoring ring tilt angle and tilt direction establish the nozzle's vector angle and vector direction, respectively. Axial translation of the vectoring ring establishes the exit area (often referred to as A9) for a given throat area (often referred to as A8).

Retaining the flaps and adjacent seals in place for an axisymmetric nozzle is very difficult because of the varying degree of skewness between the flaps and seals encountered during asymmetric operation of the nozzle for thrust vectoring. The seal has to be retained radially, with respect to the nozzle's centerline, and circumferentially to prevent the flap seals from becoming unfeathered from the adjacent flaps. Radial retention means between seals and flaps is disclosed in U.S. Pat. No. 5,269,467, entitled "Vectoring Exhaust Nozzle Seal and Flap Retaining Apparatus", and was developed to counteract the inverse exhaust pressures that occur when there is higher pressure on the radially outer surfaces of the seal and flap than on the radially inner surfaces.

Modern multi-mission aircraft application employ engines, such as the GE F110 engine, with convergent/divergent nozzles to meet operational requirements. Convergent/divergent nozzles have, in serial flow relationship, a convergent section, a throat, and a divergent section. Characteristically, these nozzles employ variable area means at both the nozzle throat and at the nozzle exit. This provides a means to maintain a desired exit to throat area ratio which in turn allows efficient control over the operation of the nozzle. The operation of the nozzle is designed to provide a nozzle exit/throat area (A9/A8) schedule which is optimized for the design cycle of the engine and ideally should provide efficient control at both low subsonic and high supersonic flight conditions. These types of nozzles typically use pneumatic or hydraulic actuators to provide the variable operation. Typically, the exit and throat areas are mechanically coupled to each other in such a manner as to create an area ratio (A9/A8) schedule which is a function of nozzle throat area (A8). The area ratio schedule is typically predetermined to provide efficient engine operation across a wide range of engine conditions but typically optimum performance at specific engine conditions is compromised somewhat in order to provide adequate efficiency throughout the range of engine operation. Thrust vectoring nozzles typically have the ability to independently control nozzle exit area and throat area which allows the engine to achieve a higher level of performance across a wide range of engine operating conditions. An additional benefit of independent throat and exit area control is the capability to overexpand the nozzle divergent system beyond its optimal performance area ratio to create divergent system static wall pressure lower than ambient pressures to thereby pull the lower temperature ambient air into the nozzle where it can be used to cool the divergent system components. Ambient pressures, as with all ambient conditions, refer to freestream conditions outside the aircraft. Ambient conditions are also generally found in unpressurized nozzle bays, i.e. the area surrounding the convergent and divergent flaps that lie inside outer flaps or engine or other casings surrounding the nozzle flaps.

The successful operation of combat aircraft is dependent, in part, upon the ability of the aircraft to remain undetected by infrared sensors of various ground and air based weapon systems, such as ground and air launched missiles, during flight. The high temperatures of the engine's exhaust gases and the hot metal turbine parts and the hot metal walls directly in contact with the hot gases cause the engine to emit high levels of infrared energy. Military aircraft engaged in combat are vulnerable to anti-aircraft missiles employing highly sophisticated infrared sensors.

A number of apparatus have been designed to reduce infrared emissions from gas turbine engines. Each type of design endeavors to provide a combination of aerodynamics, heat transfer, and geometry which will result in an effective IR suppressor for the least suppressor weight and power effects on a turbine engine. One of these types of geometries utilizes a concentric centerbody within an annular duct. This suppressor geometry is referred to as a plug or centerbody suppressor and exemplified by U.S. Pat. Nos. 4,214,441, 4,044,555, 3,970,252 and the like. Flap cooling by flowing cooling air over the hot exhaust path side of the flaps has also been suggested in several Patents such as U.S. Pat. No. 4,544,098. These hollow centerbody plug suppressors and flap cooling designs consume expensive fan and compressor air engine and power and result in reduced engine efficiency and combat operating radius.

There exists a need for apparatus to convert a aircraft gas turbine engine exhaust nozzle between ejector mode cooling of the interior hot surfaces of the divergent section of the nozzle, to suppress the engine's IR signature, during a first type of combat mission and non ejector mode to provide maximum engine and aircraft performance during a second type of combat mission.

SUMMARY OF THE INVENTION

Briefly, in accordance with one aspect of the present invention, an apparatus for selectively cooling longitudinally extending and circumferentially adjacent divergent exhaust flow confining elements bounding a hot exhaust gas flowpath in a divergent section of an aircraft gas turbine engine exhaust nozzle and providing pivoting capability for divergent flaps and seals in an axisymmetric vectoring nozzle. The apparatus includes axially adjacent forward and aft sections of at least one of the exhaust flow confining elements (typically referred to as flaps and seals), the adjacent forward and aft sections have forward and aft interior hot surfaces respectively, and mounting apparatus for mounting the aft section to the forward section in one of at least two positions. A first one of these two positions spaces apart the sections to form a gap between the sections which allows cooling air to flow onto the aft interior hot surface and a second one of these two positions places the sections in close abutting relationship so as to essentially prevent cooling air from flowing onto the aft interior hot surface. A more particular embodiment of the present invention provides the mounting apparatus with a flap pin hinge including, a first aft barrel mounted to the aft section and having at least two aft barrel lugs, a first forward barrel mounted to the forward section and having at least two forward barrel lugs, and the aft and forward barrel lugs are interdigitated and have alignable apertures with a removable first hinge pin disposed therethrough wherein the removable hinge pin is essentially perpendicular to the aft interior hot surface. A pivotal joint connects the forward section to a throat of the nozzle and has at least one axis of rotation which is transverse to the first hinge pin and may be a second pin hinge having a second aft barrel mounted to the forward section, a second forward barrel mounted to an aft end of an exhaust flow confining convergent element at the throat wherein convergent element bounds the hot exhaust gas flowpath in a convergent section of the aircraft gas turbine engine exhaust nozzle. A second hinge pin is disposed through apertures in the second aft and forward barrels.

The exemplary embodiment of the present invention provides an apparatus for selectively cooling longitudinally extending and circumferentially adjacent divergent alternating flaps and seals bounding a hot exhaust gas flowpath in a divergent section of an aircraft gas turbine engine exhaust nozzle wherein the convergent and divergent elements are convergent and divergent flaps and seals defining a throat between the convergent and divergent elements. A further embodiment provides a retaining apparatus for providing retention between the divergent flaps and seals and includes channels having transversely extending channel walls mounted on the flaps, retaining lugs supported from the seals and movably disposed within the channels, and a positioning apparatus to provide the retaining lugs with a two degree freedom of motion relative to its corresponding flap within a corresponding one of the channels. The positioning apparatus may include a pivotable bar having oppositely disposed first and second pivotable arms and corresponding distal first and second lug ends, each of the lug ends supporting one of the retaining lugs within one of the channels, and the pivotable bar pivotably supported at a point where the arms meet on a post on the seal.

ADVANTAGES OF THE PRESENT INVENTION

The present invention provides advantages over present nozzle designs by providing the capability of quickly changing the configuration of an aircraft engine exhaust nozzle that reduces infrared signature emissions to one that gets better combat performance, thus allowing one aircraft to fly two distinctly different types of combat missions. This provides a cost advantage due to the fact that one type of aircraft can fly a broader range of missions. Another advantage of the present invention is the commonality of the mounting hardware to existing nozzles which makes a nozzle designed in accordance with the present invention easier and cheaper to retrofit engines than the AVEN nozzle designs of the prior art. The present invention also provides joints (necessary to achieve thrust vectoring with an axisymmetric nozzle) that are used to accommodate nozzle ejectors which significantly increase the life of the divergent flaps and seals. The nozzle operates more efficiently than previous AVEN nozzles because the out of radial plane turning is done aft of the throat thus avoiding flow distortion or an effect on the throat's operation which is important to the throats operation. This also makes the throats operation more predictable allowing the aircraft and engine designers more latitude in designing a more aggressive capability into the engine and the aircraft.

BRIEF DESCRIPTION OF THE DRAWING

The novel features believed characteristic of the present invention are set forth and differentiated in the claims. The invention, together with further objects and advantages thereof, is more particularly described in conjunction with the accompanying drawing in which:

FIG. 3 is an elevational view of a portion of a flap configured in an ejector mode in accordance with the embodiment of the present invention illustrated in FIG. 1.

FIG. 4 is an elevational view of a portion of a flap configured in a non-ejector mode in accordance with the embodiment of the present invention illustrated in FIG. 1.

DETAILED DESCRIPTION

Figure 1:
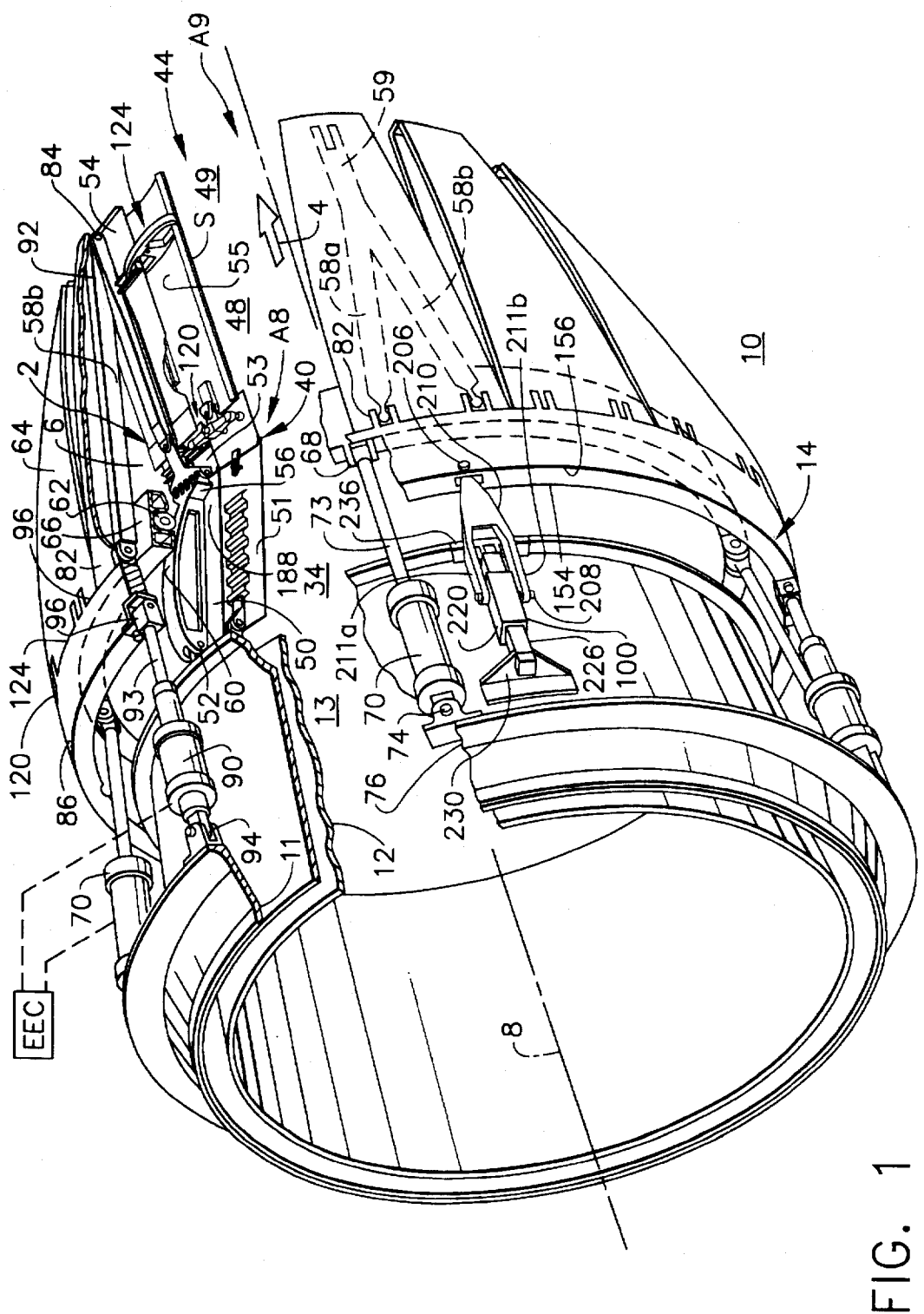
FIG. 1 is a perspective view of an axisymmetric vectoring exhaust nozzle illustrating an ejector cooling apparatus in accordance with one embodiment of the present invention.

An embodiment of the present invention is illustrated in FIG. 1 as a nozzle cooling system generally shown at 2 for an axisymmetric thrust vectoring nozzle 14 in an exhaust section 10 of an aircraft gas turbine engine (not shown in its entirety). The nozzle cooling system 2 has a convertible means to flow cooling air over longitudinally extending interior hot surfaces S of divergent flaps 54 and seals 55, which bound and confine a hot exhaust flow 4 in a divergent section 48 of the nozzle 14, to cool the divergent section of the nozzle 14 for IR suppression. Cooling air is drawn in from an engine nozzle bay 6 which is at approximately ambient conditions, far cooler than the hot surfaces S. The exhaust section 10 comprises, in serial flow relationship, a fixed area duct or engine casing 11, spaced radially outward of an afterburner liner 12, and the axisymmetric thrust vectoring nozzle 14 of the convergent/divergent type.

Still referring to FIG. 1, nozzle 14 comprises in serial flow relationship a convergent section 34, a variable area throat 40, and the divergent section 48. The convergent section 34 includes a plurality of primary or convergent flaps 50 circumferentially disposed about engine centerline 8 with overlapping primary or convergent seals 51 disposed between and in sealing engagement with the radially inward facing surface of the circumferentially adjacent convergent flaps 50. Each one of the convergent flaps 50 is pivotally attached at its forward end to casing 11 by first pivotal or clevis joint 52. The divergent flap 54 is pivotally attached at its forward end 53 to a convergent flap aft end 188 of the convergent flap 50 by a first one rotational degree of freedom (DOF) joint means in the form of a nozzle pin hinge 56 generally at an axial position in the nozzle 14 which coincides with throat 40. Divergent flaps 54 are generally circumferentially disposed about engine centerline 8 with overlapping divergent seals 55 disposed between and in sealing engagement with the radially inward facing surface of circumferentially adjacent divergent flaps 54. The divergent seals 55 are designed to seal against the divergent flaps 54 during nozzle operation when the nozzle pressure, the pressure radially inward of the flaps and seals, is normally greater than the pressure outside the nozzle, typically ambient air or nozzle bay pressure. The throat 40 has associated with it a throat area conventionally denoted as A8 and an nozzle exit 44 is generally at the end of divergent flaps 54 and has an exit area associated with it conventionally denoted as A9.

Figure 2:
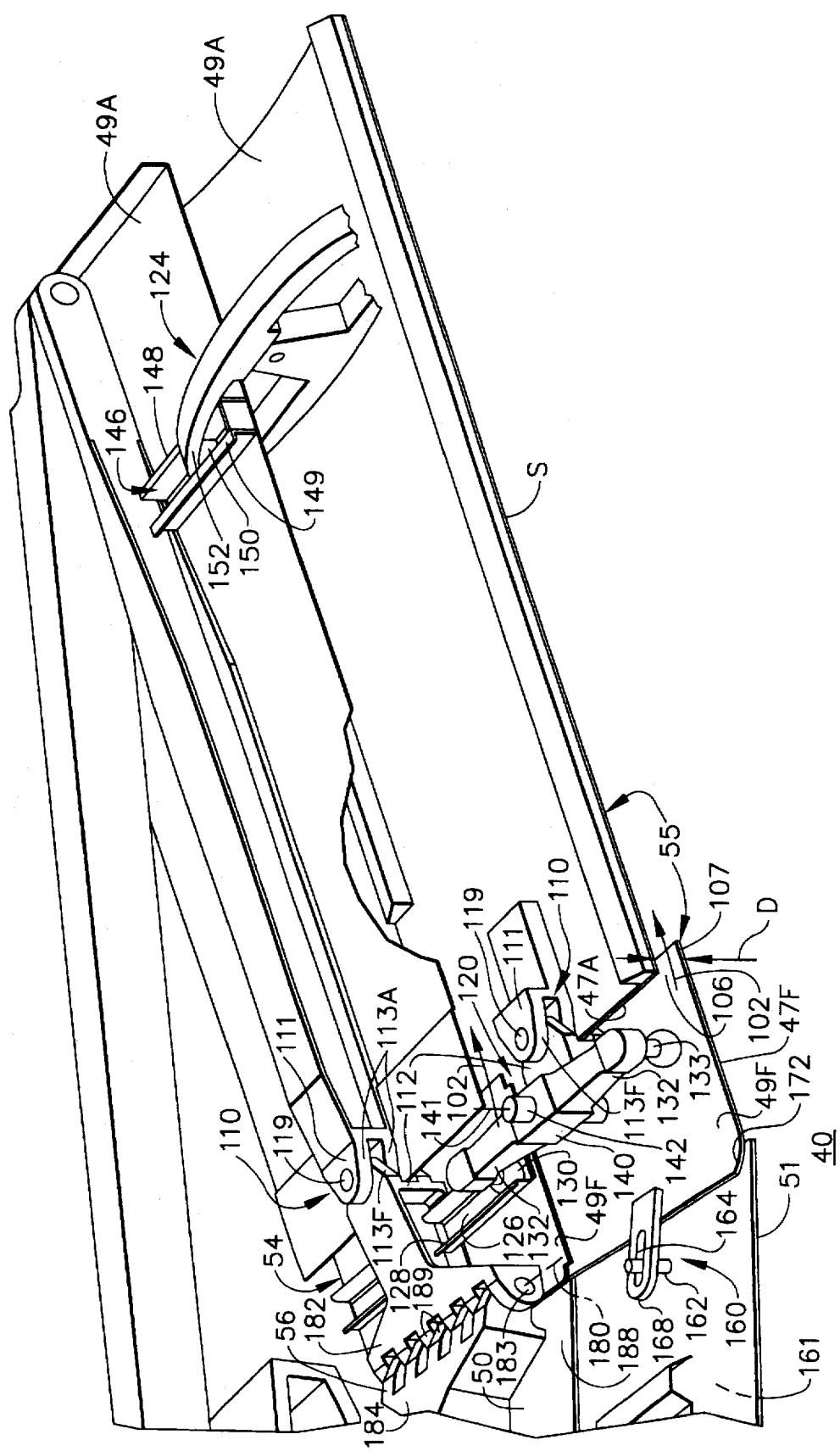
FIG. 2 is an enlarged view of the ejector cooling apparatus in the vectoring exhaust nozzle in FIG. 1.

Illustrated in greater detail in FIG. 2, is the arrangement used to mount the divergent flaps 54 and seals 55 to the convergent flaps 50 and seals 51, respectively, to selectively provide axisymmetric thrust vectoring. The nozzle pin hinge 56 provides the divergent flaps 54 with the ability to pivot about a hinge axis 180 in a radial direction with respect to the engine centerline 8 in FIG. 1. The nozzle pin hinge 56 has a multi lug aft barrel 182 mounted to the forward section 49F of the divergent flap 54 and a multi lug forward barrel 184 mounted to an aft end 186 of the convergent flap 50 at the throat 40. The multi lug aft barrel 182 and the multi lug forward barrel 184 have interdigitated multiple lugs 189 with alignable apertures 187 and a removable forward hinge pin 183 disposed therethrough. This provides a pivotal joint which connects the forward sections 49F of the divergent flaps 54 to the relatively fixed throat 40 of the nozzle 10.

Also illustrated in FIG. 2 is a convertible or selective means to provide ejector film cooling of the divergent flaps and seals. The divergent flaps 54 and seals 55 are each divided into axially adjacent forward and aft sections 49F and 49A, respectively, each of which have forward and aft interior hot surfaces 47F and 47A, respectively. The aft section 49A is mounted to the forward section 49F by a mounting means which allows the aft section to be mounted relative to the forward section in one of at least two positions. A first one of these two positions spaces apart the sections to form a gap 106 having an annular diameter D between the sections which allows cooling air 102 to flow onto the aft interior hot surface 47A and a second one of these two positions places the sections in close abutting relationship so as to essentially prevent cooling air 102 from flowing onto the aft interior hot surface. The gap 106 essentially forms an annular slot around the nozzle 14 between overlapping ends 107 of the forward and aft sections 49F and 49A, respectively. The slot helps keep the cooling air 102 on the aft interior hot surface 47A further enhancing the ejector mode cooling particularly for IR signature reduction. This allows the nozzle to be placed in either an ejector cooling mode with the gap 106 open or in a non-ejector cooling mode with the gap essentially closed. The change between the two modes is relatively simple to make and can be done in the field under combat conditions.

Circumferential centering of the divergent seal 55 to the convergent seal 51 is accomplished by an axial centering means generally shown at 160 which includes an elongated pin 162 extending outward from and perpendicular to a backside 161 of the convergent seal 51 and disposed within a wider and generally axially elongated slot 164 in a centering lug 168 which is attached to a curved lip 172 of the divergent seal 55. The lip 172 overlaps the convergent seal 51 and provides contact sealing with the convergent seal while still allowing it to pivot radially and slide somewhat in the circumferential direction to accommodate the vectoring of the nozzle 14. The Hauer nozzle in U.S. Pat. No. 4,994,660 has a universal joint between the convergent flaps 50 and the divergent flaps 54. The present invention provides the same degree of radial and circumferential pivoting at two separate axial locations in the nozzle 14. By placing the circumferential movement of the divergent flaps 54 further downstream of the throat the present invention the out of radial plane turning of the flow is done aft of the throat thus avoiding flow distortion or other unwanted effects on the throat's operation. This also makes the throats operation more predictable allowing the aircraft and engine designers more latitude in designing a larger flight envelope and/or a more aggressive capability into the engine and the aircraft.

FIG. 3 illustrates the first position of the forward and aft sections 49F and 49A, respectively of divergent flaps 54 wherein the nozzle 14 is in a cooling ejector mode and FIG.

Figure 5:
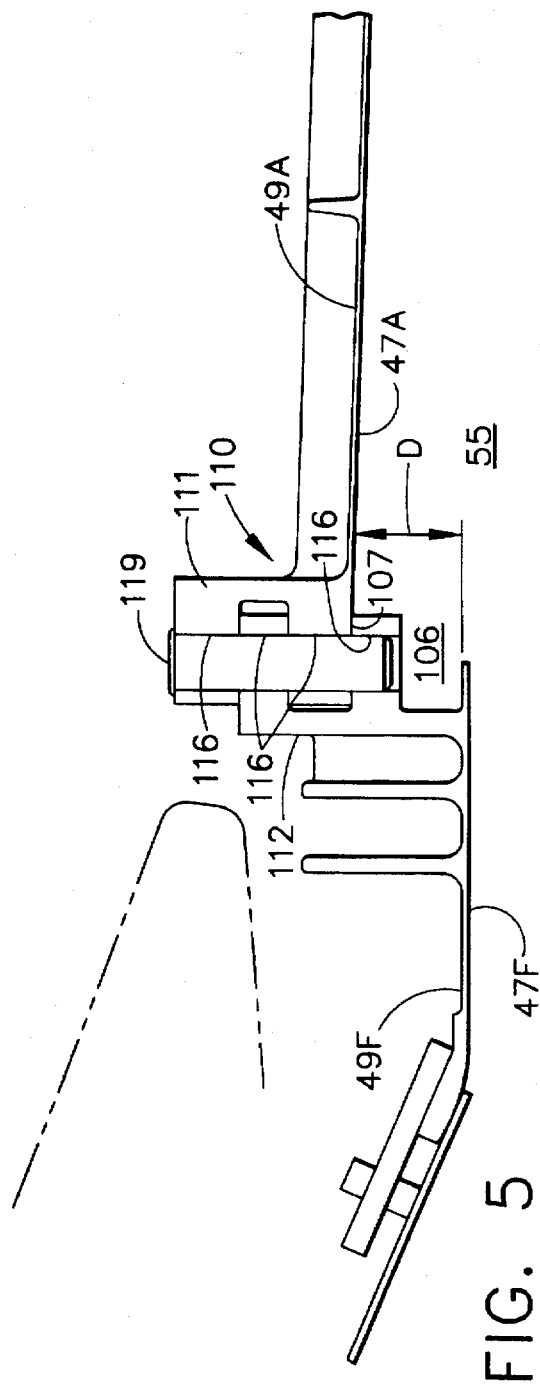
FIG. 5 is an elevational view of a portion of a seal configured in an ejector mode in accordance with the embodiment of the present invention illustrated in FIG. 1.
Figure 6:
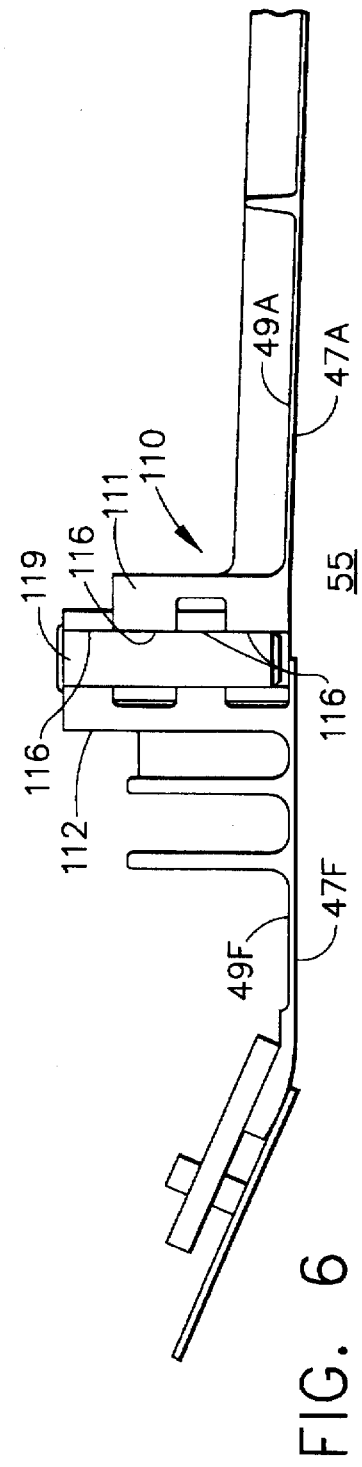
FIG. 6 is an elevational view of a portion of a seal configured in a non-ejector mode in accordance with the embodiment of the present invention illustrated in FIG. 1.

4 illustrates the second position of the forward and aft sections 49F and 49A, respectively of divergent flaps 54 wherein the nozzle is in a non-ejector mode. FIG. 5 illustrates the first position of the forward and aft sections 49F and 49A, respectively of divergent seals 55 wherein the nozzle 14 is in a cooling ejector mode and FIG. 6 illustrates the second position of the forward and aft sections 49F and 49A, respectively of divergent seals 55 wherein the nozzle is in a non-ejector mode.

Illustrated in FIGS. 2–6 is the mounting means in the exemplary form of a flap pin hinge 110 which has a first aft barrel 111 mounted to the aft section 49A and having at least two aft barrel lugs 113A, a first forward barrel 112 mounted to the forward section 49F and having at least two forward barrel lugs 113F, wherein the aft and forward barrel lugs are interdigitated and have alignable apertures 116 with a removable first hinge pin 119 disposed therethrough. The removable hinge pin 119 is essentially perpendicular to the aft interior hot surface 47A and the hinge axis 180 which is an axis of rotation which is transverse to the first hinge pin 119. The first hinge pin 119 allows the aft sections 49A of the divergent flaps 54 to pivot in a generally circumferential direction relative to the throat and engine centerline 8 which when combined with the pivoting of the forward sections 49F of the divergent flaps 54 vectors the thrust of the engine by vectoring or directing the hot exhaust flow 4. The aft section 49A is mounted to the forward section 49F by a mounting means which allows the aft section to be mounted relative to the forward section in one of at least two positions determined by whether the two aft barrel lugs 113A are above or below the corresponding two forward barrel lugs 113F.

The adjacent divergent flaps 54 and seals 55 which are normally disposed in overlapping sealing relationship about the unvectored nozzle centerline which coincides with engine centerline 8. The seals 55 are disposed radially inward of the adjacent flaps and designed to seal against the flaps during normal nozzle operation when the nozzle pressure, the pressure radially inward of the flaps 54 and seals 55, is normally greater than the pressure in the nozzle bay 6. A forward divergent seal retaining means 120 and an aft divergent seal retaining means 124 (also generally illustrated in FIG. 1) retains the divergent seals against the divergent flaps during thrust vectoring and when pressure in the bay 6 increases above pressure in the divergent section of the nozzle 14. The nozzle 14 vectors thrust by positioning the divergent flaps 54 and seals 55 asymmetrically relative to the centerline 8; therefore, the radial and circumferential positions and attitude and to this end the forward and aft retaining means 120 and 124, respectively, are provided to retain the seal 55 against the flap 54 during reverse pressure gradients as described earlier. These are similar to the seal to flap retaining means disclosed in U.S. Pat. No. 5,269,467.

A plurality of cam rollers 62 are disposed in a primary ring 66 which in turn is translated forward and aft by a plurality of primary actuators 70, of which there are four in the preferred embodiment. The variable throat area A8 is controlled by the action of cam roller 62 on the cam surface 60 which is formed on the back of convergent flap 50. During operation the high pressure of the exhaust gases within the nozzle force convergent flaps 50 and divergent flaps 54 radially outward, thus, keeping cam surface 60 in contact with one of the cam rollers 62. An annular actuator support 76 is mounted to the engine casing 11 and primary actuator 70 is pivotally connected to the actuator support by a universal ball joint 74. Primary actuator 70 has an actuator rod 73, which in turn, is connected to primary ring 66 by a spherical joint 68.

A plurality of vectoring actuators 90, of which there are three in the preferred embodiment, are equi-angularly disposed circumferentially around casing 11 and mounted to actuator support 76 by universal ball joints 94 in a similar manner as actuators 70. An actuating ring 86 is connected to vectoring actuators 90 at the aft end of a vectoring actuator rod 93 by a spherical joint 96. This provides for actuating ring 86 to be axially translated and tilted about centerline 8 in order to control its attitude. Actuating ring 86 controls the positioning or pivoting of divergent flaps 54.

The nozzle pin hinge 56 and the flap pin hinge 110 allow the forward section 49F of the divergent flaps 54 to pivot radially with respect to the engine centerline 8 and allows the aft sections 49A of the divergent flaps to pivot in a generally circumferential direction relative to the throat and engine centerline 8. This effectively allows the aft sections 49A of the divergent flaps 54 to pivot in both the radial and circumferential directions to vector the thrust of the engine by vectoring or directing the hot exhaust flow 4. Pivoting of the forward and aft sections 49F and 49A of the divergent flaps 54 is controlled in a multi-degree of freedom manner by a plurality of respective Y-frames 59 having control arms 58a and 58b that operably connect secondary actuating ring 86 to the aft sections 49A of the divergent flap 54. Outer flaps 64 are at least partially supported by Y-frames 59 and provide a clean and smooth aerodynamic shape along the exterior of the nozzle.

Control arms 58a and 58b are connected to actuating ring 86 by 3 DOF spherical joints 82 which provide clevis type pivoting of the Y-frames 59 and the Y-frame is connected to the aft end of divergent flap 54 by a spherical joint 84. This linkage is operable to translate an attitude change of actuating ring 86 into a multi-degree of freedom pivoting change or orbital movement of divergent flap 54 whereby each divergent flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to actuating ring 86. Backbone 92 provides a mount for the divergent flap 54 and support for joints 84 and the first aft barrel 111 and the first forward barrel 112 at its opposite two ends.

Actuating ring 86 is supported by three axially adjustable actuating ring support means 100, equi-angularly disposed circumferentially about casing 11, that allows actuating ring 86 to be axially translated and gimballed by vectoring actuators 90. An axially translating A-frame 210 supports actuating ring 86 by a 3 DOF spherical joint 206. The A-frame 210 is pivotally attached to the slider 220 with a clevis type hinge means 208 in the form of spherical joints at the ends of arms 211a and 211b. The use of spherical joints at the ends of arms 211a and 211b provide clevis type pivoting for A-frame 210 and also eliminate the transfer of twisting loads that may be imparted to the arms. The slider 220 is slidable along a hollow slider bar 226 that is attached to engine casing 11 by forward bracket 230 and an aft bracket 236. The slider 220 is slidable along a hollow slider bar 226 that is attached to the engine casing 11 by a forward bracket 230 and an aft bracket 236. The actuating ring support means 100 permits the actuating ring 86 to translate axially forward and rearward and tilt so as to change its attitude. A more detailed description of the actuating ring support means 100 may be found in U.S. Pat. No. 5,174,502, by Lippmeier et al., entitled "Support for a Translating Nozzle Vectoring Ring", herein incorporated by reference.

Thrust vectoring nozzles vector thrust by positioning the divergent flaps 54 and seals 55 asymmetrically relative to the centerline 8, therefore, the radial and circumferential positions and attitude of the divergent flaps and seals. The actuating vectoring ring 86 is translated and gimballed about centerline 8 by at least 3 vectoring actuators 90 and which are also used to translate the vectoring ring to accommodate and/or control the variable exit area A9 and set the exit area to throat area ratio A9/A8. The variable throat area A8 may be independently set by translation of the primary ring 66 by the primary actuators 70. Alternatively, both sets of actuators and rings may be used in combination to set the exit area to throat area ratio A9/A8.

FIG. 2 illustrates, in more detail, the forward retaining means 120 having a transversely extending forward channel 126 including forward channel walls 128 mounted on the back of the flap 54. A spherically shaped forward retaining lug 130 is supported from the seal 55 at the end of a forward arm 132 and is movably disposed within the forward channel 126.

The narrow width of the forward channel 126 restricts the movement of the forward retaining lug 130 and provides it with a single degree of freedom (1 DOF) of motion in a direction transverse to the axial direction and still allows the lug to rotate within the forward channel. The pivotable bar 140 is pivotably mounted at its center 141 about a forward post 142 preferably cast with and radially extending outward from a forward position of the back of seal 55. The pivotable bar 140 is secured onto the forward post 142. The forward post 142 may be threaded at its top and a machined flange bushing used to pivotably support pivotable bar 140 secured by a nut on the threaded top of the forward post. The spherical shaped forward retaining lug 130 looks and operates somewhat like a trailer hitch ball. The lugs are necessary to maintain contact in the divergent flap forward channels when the exhaust nozzle is vectored. This is more clearly shown in U.S. Pat. No. 5,269,467 as is an alternative forward retaining means having spring loaded spherically shaped forward retaining lugs 130, each of which is mounted on a shaft 133 which is slideably disposed within a hole in each one of the forward arms 132 of the pivotable bar 140 (not shown) through the forward arm.

The aft retaining means 124 having a transversely extending aft channel 146, including aft channel walls 148, that is mounted on the back of the divergent flap 54. An aft retaining lug 150 is supported from the divergent seal 55 at the end of an aft arm 152 and is movably disposed within the aft channel 146. An aft positioning means is provided to help position adjacent divergent flaps 54 and divergent seals 55 by positioning the aft retaining lug 150 within the aft channel 146 when the adjacent divergent seal 55 and divergent flap 54 are moved and, in particular, when their attitudes with respect to each other is changed during thrust vectoring. The aft positioning means provides a relatively wide width for the aft channel 146 which permits 2 DOF movement of the aft retaining lug 150 with respect to the flap 54 in the transverse and longitudinal directions. A hook may be provided at the lug supporting ends of aft arms 152 and the end of aft channel 146 may have a circumferential retention means, to prevent unfeathering between the seal 55 and the flap 54. This is explained in more detail in U.S. Pat. No. 5,269,467.

While the preferred embodiment of our invention has been described fully in order to explain its principles, it is understood that various modifications or alterations may be made to the preferred embodiment without departing from the scope of the invention as set forth in the appended claims.

We claim:

1. An apparatus for selectively cooling longitudinally extending and circumferentially adjacent divergent exhaust flow confining elements bounding a hot exhaust gas flowpath in a divergent section of an aircraft gas turbine engine exhaust nozzle, said apparatus comprising:

axially adjacent forward and aft sections of at least one of the exhaust flow confining elements;

said adjacent forward and aft sections having forward and aft interior hot surfaces respectively;

a mounting means for mounting said aft section to said forward section in at least two postions relative to each other and said mounting mean connected to said forward and aft sections;

wherein a first one of said two positions space apart said sections with a radial gap between said sections which allows cooling air to flow onto said aft interior hot surface;

wherein a second one of said two positions places said sections in close abutting relationship so as to essentially prevent cooling air from flowing onto said aft interior hot surface;

said mounting means comprising a flap pin hinge including;

a first aft barrel mounted to said aft section and having at least two aft lugs, a first forward barrel mounted to said forward section and having at least two forward lugs, and said aft and forward lugs are interdigitated and have alignable apertures with a removable first hinge pin disposed therethrough, said removable hinge pin essentially perpendicular to said aft interior hot surface.

2. An apparatus as claimed in claim 1 further comprises a pivotal joint between said forward section and a throat of the nozzle, said pivotal joint having at least one axis of rotation which is transverse to said first hinge pin.

3. An apparatus as claimed in claim 2 wherein said pivotal joint comprises:

a second pin hinge having a second aft barrel mounted to said forward section, a second forward barrel mounted to an aft end of a exhaust flow confining convergent element at said throat, said convergent element is one of a plurality of convergent elements bounding the hot exhaust gas flowpath in a convergent section of the aircraft gas turbine engine exhaust nozzle, and a second hinge pin disposed through apertures in said second aft and forward barrels.

4. An apparatus for selectively cooling longitudinally extending and circumferentially adjacent alternating divergent flaps and seals bounding a hot exhaust gas flowpath in a divergent section of an aircraft gas turbine engine exhaust nozzle, said apparatus comprising:

axially adjacent forward and aft sections of each of the flaps and seals, said adjacent forward and aft sections having forward and aft interior hot surfaces respectively, a mounting means for mounting said aft section to said forward section in at least two positions relative to each other and said mounting mean connected to said forward and aft sections;

wherein a first one of said two positions spaces apart said sections with a radial gap between said sections which allows cooling air to flow onto said aft interior surface;

wherein a second one of said two position places said sections in close abutting relationship so as to essentially prevent cooling air from flowing onto said aft interior hot surface;

said mounting means comprising a flap pin hinge including;
- a first aft barrel mounted to said aft section and having at least two aft barrel lugs,
- a first forward barrel mounted to said forward section and having at least two forward barrel lugs,
- said aft and forward barrel lugs are interdigitated and have alignable apertures with a removable first hinge pin disposed therethrough, said removable hinge pin essentially perpendicular to said aft interior hot surface,
- a pivotal joint between said forward section and a throat of the nozzle, said pivotal joint having at least one axis of rotation which is transverse to said first hinge pin,
- a second pin hinge having a second aft barrel mounted to said forward section,
- a second forward barrel mounted to an aft end of a exhaust flow confining convergent element at said throat and wherein said convergent element bounds the hot exhaust gas flowpath in a convergent section of the aircraft gas turbine engine exhaust nozzle, and
- a second hinge pin disposed the apertures in said second aft and forward barrels said second hinge pin being collinear with said axis of rotation.

5. An apparatus as claimed in claim 4 further comprising:
a retaining apparatus for providing retention between the flaps and seals, said seal retaining apparatus comprising;
- channels having transversely extending channel walls mounted on flaps wherein said channel walls extend transversely with respect to a longitudinal direction in which said flaps extend,
- retaining lugs supported from the seals and movably disposed within said channels, and
- a positioning means to provide said retaining lugs with a two degree freedom of motion relative to its corresponding flap within a corresponding one of said channels.

6. An apparatus as claimed in claim 5 wherein said positioning means comprises:
- a pivotable bar having oppositely disposed first and second pivotable arms and corresponding distal first and second lug ends,
- each of said lug ends supporting one of said retaining lugs within one of said channels, and
- said pivotable bar pivotably supported at a point where said arms meet on a post on the seal.

7. An aircraft as turbine engine variable exhaust axisymmetric vectoring nozzle, said nozzle comprising:
- a plurality of longitudinally extending and circumferentially adjacent divergent alternating flaps an seals bounding a hot exhaust gas flowpath in a divergent section of the nozzle,
- axially adjacent forward and aft sections of each of said flaps and seals,
- said adjacent forward and aft sections having forward and aft interior hot surfaces respectively,
- a mounting means for mounting said aft section to said forward section in at least two positions relative to each other and said mounting means connected to said forward and aft sections;
- wherein a first one of said two positions spaces apart said section with a radial gap between said sections which allows cooling air to flow onto said aft interior hot surface;
- wherein a second one of said two positions places said sections in close abutting relationship so as to essentially prevent cooling air from flowing onto said aft interior hot surface;

said mounting means comprising a flap pin hinge including;
- a first aft barrel mounted to said aft section and having at least two aft barrel lugs,
- a first forward barrel mounted to said forward section and having at least two forward barrel lugs,
- said aft and forward barrel lugs are interdigitated and have alignable apertures with a removable first hinge pin disposed therethrough said removable hinge pin essentially perpendicular to said aft interior hot surface,
- a pivotal joint between said forward section and a throat of the nozzle, said pivotal joint having at least one axis of rotation which is transverse to said first hinge pin,
- a second pin hinge having a second aft barrel mounted to said forward section,
- a second forward barrel mounted to an aft end of a exhaust flow confining convergent element at said throat and wherein said convergent element bounds the hot exhaust gas flowpath in a convergent section of the aircraft gas turbine engine exhaust nozzle, and
- a second hinge pin disposed through apertures in said second aft and forward barrels said second hinge pin being collinear with said axis of rotation.

8. A nozzle as claimed in claim 7 further comprising:
a retaining apparatus for providing retention between the flaps and seals, said seal retaining apparatus comprising;
- channels having transversely extending channel walls mounted on flaps wherein said channel walls extend transversely with respect to a longitudinal direction in which said flaps extend,
- retaining lugs supported from the seals and movably disposed within said channels, and
- a positioning means to provide said retaining lugs with a two degree freedom of motion relative to its corresponding flap within a corresponding one of said channels.

9. A nozzle as claimed in claim 8 wherein said positioning means comprises:
- a pivotable bar having oppositely disposed first and second pivotable arms and corresponding distal first and second lug ends,
- each of said lug ends supporting one of said retaining lugs within one of said channels, and
- said pivotable bar pivotably supported at a point where said arms meet on a post on the seal.

* * * * *